(12) United States Patent
Naiwala et al.

(10) Patent No.: US 10,629,088 B2
(45) Date of Patent: Apr. 21, 2020

(54) DRIVING ASSISTANCE DEVICE AND METHOD

(71) Applicant: TOYOTA JIDOSHA KABUSHIKI KAISHA, Toyota-shi, Aichi (JP)

(72) Inventors: Chandrasiri Pathiranehelage Naiwala, Tokyo (JP); Shojiro Takeuchi, Tokyo (JP); Hironobu Sugimoto, Chofu (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 949 days.

(21) Appl. No.: 14/346,797

(22) PCT Filed: Sep. 21, 2012

(86) PCT No.: PCT/JP2012/074261
§ 371 (c)(1),
(2) Date: Mar. 24, 2014

(87) PCT Pub. No.: WO2013/047383
PCT Pub. Date: Apr. 4, 2013

(65) Prior Publication Data
US 2014/0212849 A1    Jul. 31, 2014

(30) Foreign Application Priority Data
Sep. 26, 2011    (JP) .................. 2011-209326

(51) Int. Cl.
*B60W 40/09*    (2012.01)
*G09B 5/12*    (2006.01)
(Continued)

(52) U.S. Cl.
CPC ............... *G09B 5/12* (2013.01); *B60W 40/09* (2013.01); *G09B 9/042* (2013.01); *G09B 9/052* (2013.01); *G09B 19/167* (2013.01)

(58) Field of Classification Search
CPC .................... G09B 19/167; B60W 40/09
(Continued)

(56) References Cited

U.S. PATENT DOCUMENTS 9,704,401 B2 *   7/2017   Akavaram ............. G08G 1/146
2005/0131597 A1 *   6/2005   Raz ....................... G07C 5/085
701/29.1
(Continued)

FOREIGN PATENT DOCUMENTS

JP    2003-83108       3/2003
JP    2003-099897 A    4/2003
(Continued)

*Primary Examiner* — Xuan M Thai
*Assistant Examiner* — Sadaruz Zaman
(74) *Attorney, Agent, or Firm* — Finnegan, Henderson, Farabow, Garrett & Dunner, LLP (57) ABSTRACT

A driving skill in input driving data is acquired from driving skill classification unit, driving data, which includes a driving skill higher than the driving skill in the input driving data and of which a similarity to the input driving data is at least a predetermined similarity, is selected from among driving data stored in a driving data storage unit, a difference between the selected driving data and the input driving data is detected, and a notice on the detected difference is issued as driving advice. As a result, it is possible to present suitable advice to improve a driving skill taking into account the skill and type of a driver.

12 Claims, 7 Drawing Sheets

(51) Int. Cl.
*G09B 9/052* (2006.01)
*G09B 19/16* (2006.01)
*G09B 9/042* (2006.01)

(58) Field of Classification Search
USPC .............................................. 434/29, 62, 65
See application file for complete search history.

(56) References Cited

U.S. PATENT DOCUMENTS

| | | | |
|---|---|---|---|
| 2005/0234626 A1* | 10/2005 | Shiiba | B60W 10/06 701/70 |
| 2008/0105482 A1* | 5/2008 | Yamaguchi | G05B 15/02 180/271 |
| 2010/0209881 A1* | 8/2010 | Lin | G09B 19/167 434/65 |
| 2010/0209882 A1* | 8/2010 | Lin | G09B 19/167 434/65 |
| 2010/0209889 A1* | 8/2010 | Huang | B60W 40/09 434/65 |
| 2010/0209890 A1* | 8/2010 | Huang | G09B 9/05 434/65 |

FOREIGN PATENT DOCUMENTS

| | | |
|---|---|---|
| JP | 2008-285015 | 11/2008 |
| JP | 2010-144684 | 7/2010 |
| JP | 2012-113831 | 6/2012 |

* cited by examiner

DRIVING ASSISTANCE DEVICE AND METHOD

CROSS-REFERENCE TO RELATED APPLICATIONS

This application is a national phase application of International Application No. PCT/JP2012/074261, filed Sep. 21, 2012, and claims the priority of Japanese Application No. 2011-209326, filed Sep. 26, 2011, the content of both of which is incorporated herein by reference.

TECHNICAL FIELD

The present invention relates to a technology for assisting the improvement of a driving skill.

BACKGROUND ART

A technology of determining the driving skill of a driver from data (driving data) that is obtained when a vehicle is actually driven has been under development (PTL 1 and the like). Additionally, a technology of improving a driving skill by determining the driving skill and issuing a notice on an improvement point has also been under development. The advice on the improvement point is given on a basis of a difference between the driving data and example data.

Furthermore, research on determining, from the data obtained during driving, whether the driver is, for example, a prudent driver or a debilitated driver has been undergoing (PTL 2).

CITATION LIST

PTL 1: Japanese Patent Application Laid-open No. 2003-83108
PTL 2: Japanese Patent Application Laid-open No. 2008-285015

SUMMARY OF INVENTION

Technical Problem

In giving advice to improve driving skill, the issuance of a notice to a driver on a difference between his/her actual driving and sample driving based on example data is not so meaningful if the driver's skill differs too much from sample driving skill. For example, giving an inexperienced driver advice based on comparison between his/her driving skill and a racing driver's skill is not so meaningful. Similarly, the issuance of a notice on a difference between the driver's actual driving and sample driving based on example data on a driver of different driving type is not very effective.

In order to achieve driving skill improvement, it is desired to give advice to a driver on the basis of comparison with a highly skilled driver of similar type.

An object of the present invention is to present suitable advice for the improvement of a driving skill, taking into consideration the skill and type of a driver.

Technical Solution

In order to solve the aforementioned problem, a driving assistance device according to the present invention includes driving data storage unit, driving skill classification unit, driving data acquisition unit, similarity calculation unit, difference detection unit, and driving assistance unit. The driving data storage unit is configured to store driving data on a plurality of drivers in association with driving skills of the driver. The driving skill classification unit is configured to receive driving data as input, and to determine a driving skill in this driving data. The driving data acquisition unit is configured to receive input of driving data. The similarity calculation unit is configured to calculate a similarity between two pieces of driving data. The difference detection unit is configured to detect a difference in driving operation from the two pieces of driving data. The driving assistance unit is configured to give driving advice.

The driving assistance unit is further configured to acquire, from the driving skill classification unit, a driving skill in driving data input to the driving data acquisition unit, and to select driving data that satisfies the following conditions, from among the driving data stored in the driving data storage unit. That is, the driving assistance unit is configured to select driving data, which includes driving skill higher than the driving skill in the input driving data and of which a similarity to the input driving data calculated by the similarity calculation unit is at least a predetermined similarity. Then, the driving assistance means detects a difference between the selected driving data and the input driving data by the difference detection unit, and issues a notice on the detected difference as driving advice.

Thus, a driving skill is obtained from driving data, and driving advice is given in reference to a driver who has a skill higher than the driving skill of a driver, and is similar, so that adequate advice for the improvement of the driving skill can be given.

The driving data is data obtained from sensors of a vehicle during driving of the vehicle. The driving data includes, for example, acceleration (longitudinal and cross directions), a steering angle, brake strength, accelerator strength, laser radar information, position information, and the like. In a case where the driving data is time sampling data periodically acquired from these sensors, data regarding a distance corresponding a position on a road (e.g., data collected at even intervals) is preferably normalized to be utilized. At the time of normalization, an interpolation process may be performed as necessary.

The driving skill classification unit is created by machine learning on the basis of driving data that includes a known driving skill. The classification of the driving skills can include, for example, an inexperienced driver, an intermediate level driver, an advanced level driver, a professional driver, and the like. A feature value at the time of performing machine learning can be extracted by, for example, FFT (Finite Fourier Transform), DCT (Discrete Cosine Transform), or wavelet transform. Additionally, as a machine learning algorithm, SVM (Support Vector Machine), AdaBoost (Adaptive Boosting), or the like can be employed.

The similarity calculation unit calculates the similarity of the driving data by a method such as principal component analysis (PCA), k-nearest neighbor algorithm (k-NN), and k-means clustering (k-means). The driving assistance unit preferably selects driving data that is the most similar to the input driving data.

The present invention can be considered as a driving assistance device that has at least a part of the aforementioned means. Additionally, the present invention can be considered as a driving assistance method that includes at least a part of the aforementioned processes, and a program for causing a computer to execute this method. The present invention can be configured by combining the aforementioned means and processes as many as possible.

Advantageous Effects of Invention

According to the present invention, it is possible to present suitable advice for the improvement of a driving skill, taking into consideration the skill and type of a driver.

DESCRIPTION OF EMBODIMENTS

Hereinafter, a preferred embodiment of this invention will be illustratively described in detail with reference to the figures.
[Configuration]

Figure 1:
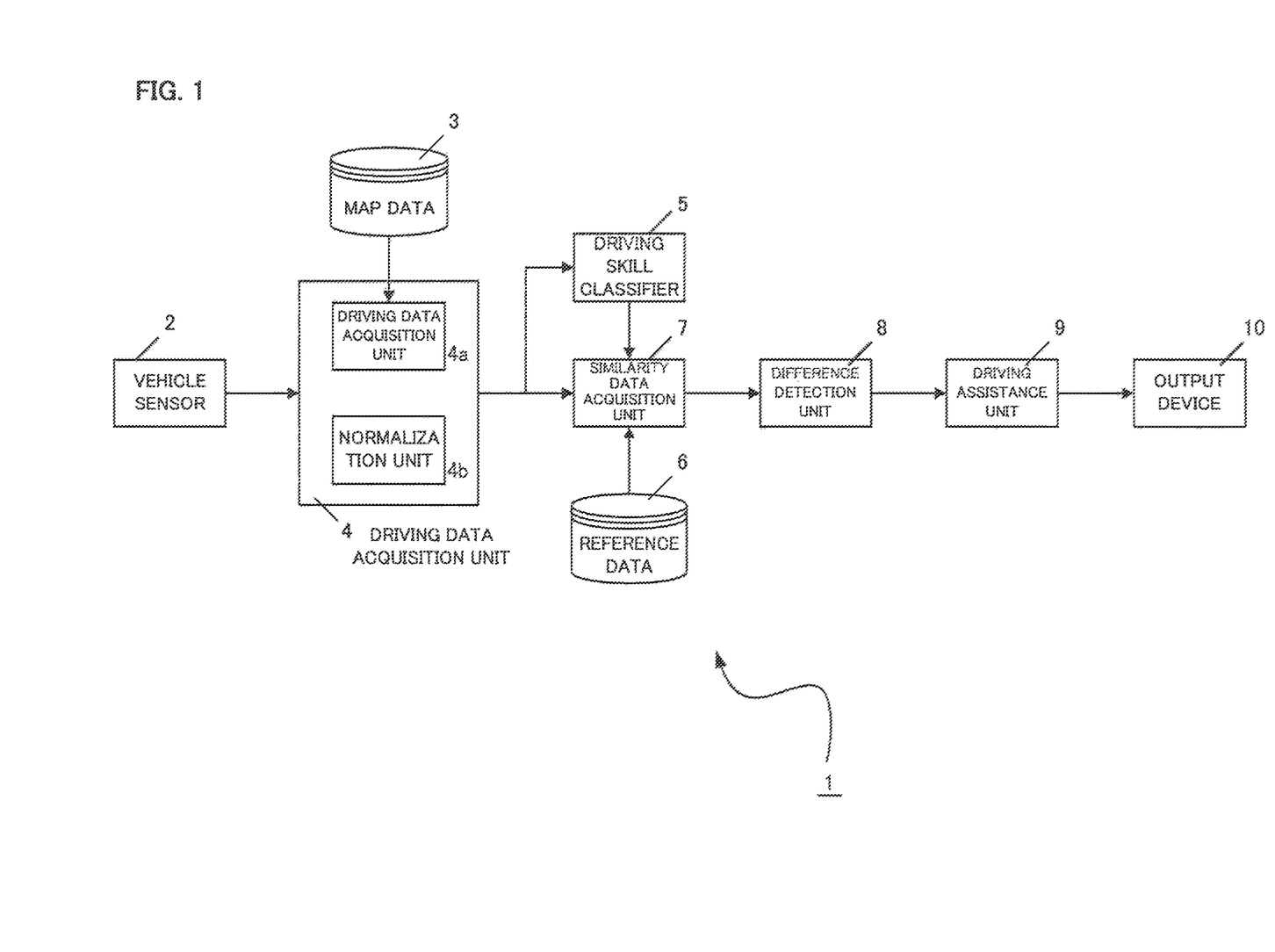
FIG. 1 is a diagram showing a function configuration of a driving assistance device according to this embodiment.

FIG. 1 is a diagram showing a function configuration of a driving assistance device that is mounted on a vehicle according to this embodiment. The driving assistance device according to this embodiment acquires data that is obtained when the vehicle is actually driven, and gives advice on an improvement point for the improvement of a driving skill. In this embodiment, an example in which the driving assistance device is mounted on a vehicle is described. However, in the present invention, it is not necessary that the driving assistance device is always mounted on a vehicle. That is, a driving assistance device that is provided separately from a vehicle is capable of acquiring driving data via communication or a storage medium and presenting driving advice.

In the driving assistance device according to this embodiment, a central processing unit (CPU) loads and executes a computer program that is stored in an auxiliary storage device, thereby causing the driving assistance device to function as a map data storage unit 3, a driving data acquisition unit 4, a driving skill classifier 5, a reference data storage unit 6, a similarity data acquisition unit 1, a difference detection unit 8, and a driving assistance unit 9.

The driving data acquisition unit 4 periodically acquires driving data during traveling from various vehicle sensors 2. The vehicle sensors 2 are, for example, an acceleration sensor, a steering angle sensor, a brake sensor, an accelerator sensor, a laser radar, a GPS device, and the like. The driving data acquisition unit 4 acquires data from these vehicle sensors 2 at a constant cycle, for example, at 0.1 sec. interval or the like, The acquisition cycle may be different for each sensor.

The driving data acquisition unit 4 converts sensor data acquired at a constant time interval into information for each constant distance. Therefore, the driving data acquisition unit 4 includes a traveling path acquisition unit 4a and a normalization unit 4b. The traveling path acquisition unit 4a acquires information regarding a traveling course that is stored in the map data storage unit 3. The normalization unit 4b associates position information that is obtained from the GPS device with the traveling course, and converts the associated information into data for each constant distance (e.g., for one meter). In a case where data at a sampling position is not acquired from a sensor, the data at the position may be obtained by an interpolation process, or data at the nearest position may be employed.

Figure 2:
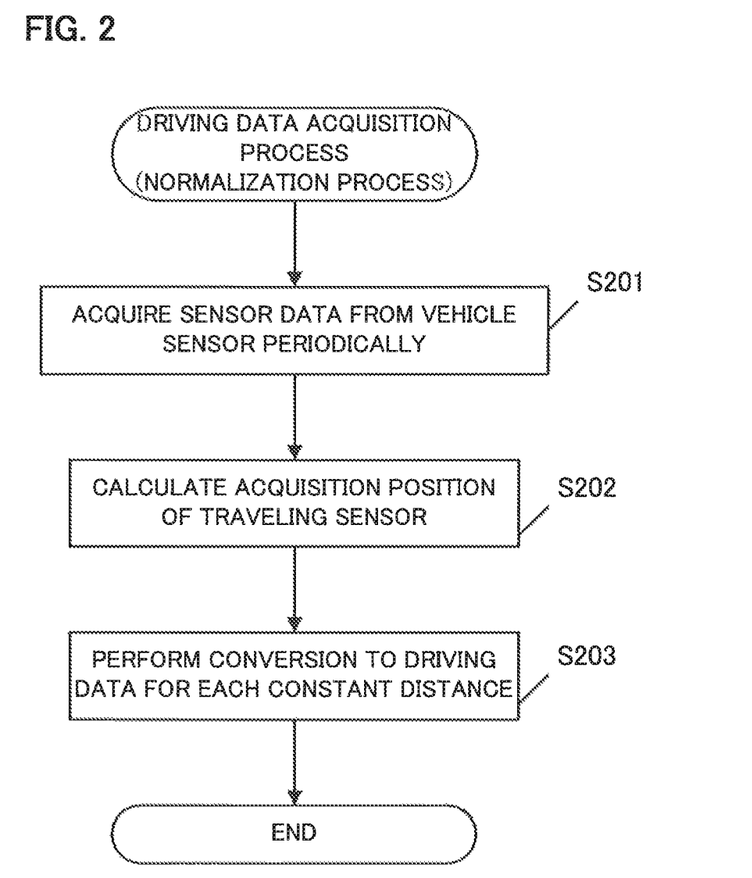
FIG. 2 is a flowchart showing a process of acquiring driving data performed by a driving data acquisition unit.

FIG. 2 is a flowchart for illustrating a process of acquiring driving data performed by the driving data acquisition unit 4. The driving data acquisition unit 4 acquires sensor data from the vehicle sensors 2 periodically (e.g., at 0.1 sec. interval) (S201). The driving data acquisition unit 4 calculates an acquisition position of a traveling sensor on the basis of position information that is included in the acquired sensor data, and map data that is acquired by the traveling path acquisition unit 4a (S202). Then, the normalization unit 4b converts the calculated acquisition position into driving data for each constant distance (S203).

The driving skill classifier 5 is a function unit that receives driving data as input and determines a driving skill of the driving. Herein, the driving skill includes four levels of a beginner, an intermediate level driver, an advanced level driver, and a professional. However, classification may be different from this.

Figure 3:
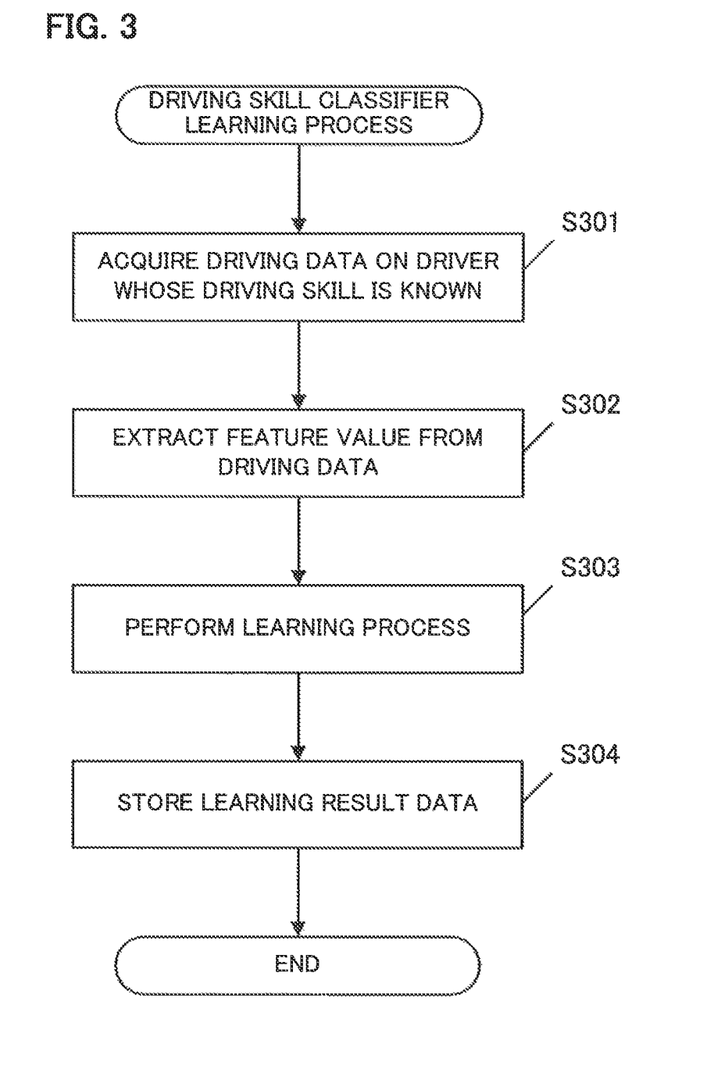
FIG. 3 is a flowchart showing a creation process of a driving skill classifier.

The driving skill classifier 5 can be created by machine learning. The creation process of the driving skill classifier 5 is shown in a flowchart in FIG. 3. First, a plurality of pieces of driving data (learning data) of drivers whose driving skills are known are acquired (S301). Then, a feature value is extracted from the acquired driving data (S302). The feature value may be extracted by an arbitrary known method. For example, the feature value can be extracted by using discrete Fourier transform (FFT), discrete cosine transform (DCT), wavelet transform, or the like. Then, the creation of the classifier is enabled, by performing a machine learning process (S303). As a machine learning algorithm, SVM (Support Vector Machine), AdaBoost, or the like can be employed. A learning result is stored in a storage device (not shown) (S304), and is referenced at the time of an identification process.

Figure 4:
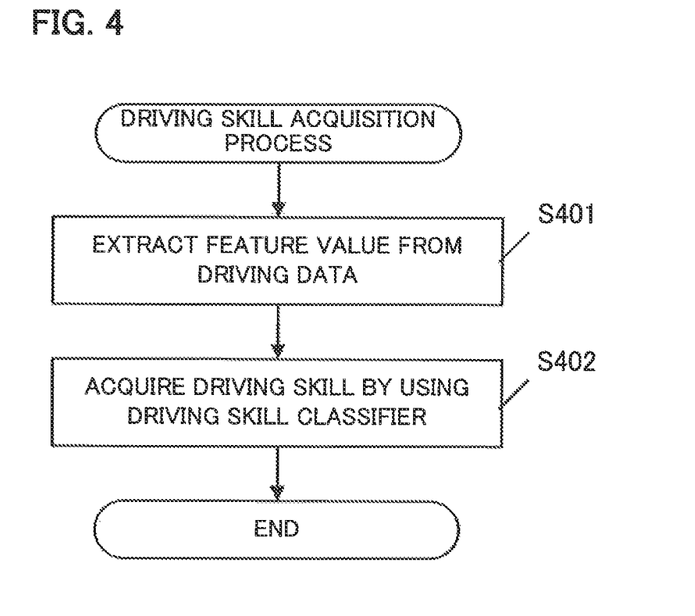
FIG. 4 is a flowchart showing an identification process of a driving skill using the driving skill classifier.

FIG. 4 is a flowchart showing an identification process by the driving skill classifier 5. The driving skill classifier 5 performs feature value extraction similar to the aforementioned extraction when the driving data is input (S401), and determines the driving skills of the input driving data by performing determination using learning result data (S402).

The similarity data acquisition unit 7 calculates a similarity between each of the pieces of driving data that are stored in the reference data storage unit 6 and input of driving data. The driving skills of the pieces of driving data that are stored in the reference data storage unit 6 are known, and are stored in association with driving skills. The driving data stored in the reference data storage unit 6 may be the same as data used in the learning process of the driving skill classifier 5, or may be different from the data.

The similarity data acquisition unit 7 acquires, from the reference data storage unit 6, driving data that satisfies the following two references. The first reference is that a driving skill is higher than the driving skill in the input driving data that is determined by the driving skill classifier 5. The second reference is that a similarity is the largest among pieces of driving data that satisfy the first reference. That is, the similarity data acquisition unit 7 acquires, from the reference data storage unit 6, driving data that includes a driving skill higher than the driving skill in the input driving data, and is the most similar to the input driving data. The calculation of the similarity can be implemented, by using an algorithm such as principal component analysis (PCA), k-nearest neighbor algorithm, k-means clustering.

The difference detection unit 8 detects a difference between the input driving data and the driving data acquired by the similarity data acquisition unit 7. It is expected that various differences appear in the sensor data, with these various differences being detected with distinction between a difference serving as a cause and a difference serving as a result. The examples of the difference that serves as a cause include a traveling speed, an accelerator amount, a brake amount, a handle steering angle, and the like. These differences are sometimes results that are caused by previous operation differences. Additionally, as other differences that represent results, acceleration and the like are also included.

For example, it is conceived that while a skilled driver suitably reduces the speed before a curve to enter the curve, a unskilled driver enters the curve at a high speed. As a result, steering handle operation is not constant during traveling on the curve, or a jerk in a cross direction occurs. In this case, the difference corresponding to the cause is a brake amount (or speed) before the curve. The difference corresponding to the result is a steering handle operation amount during the traveling on the curve, or the jerk in cross direction.

The driving assistance unit 9 presents differences that are detected by the difference detection unit 8 as driving advice to an output device 10. Specifically, driving assistance unit 9 advises to correct the difference regarding the cause, and presents an effect that is obtained as the result.

Operational Example

Figure 5:
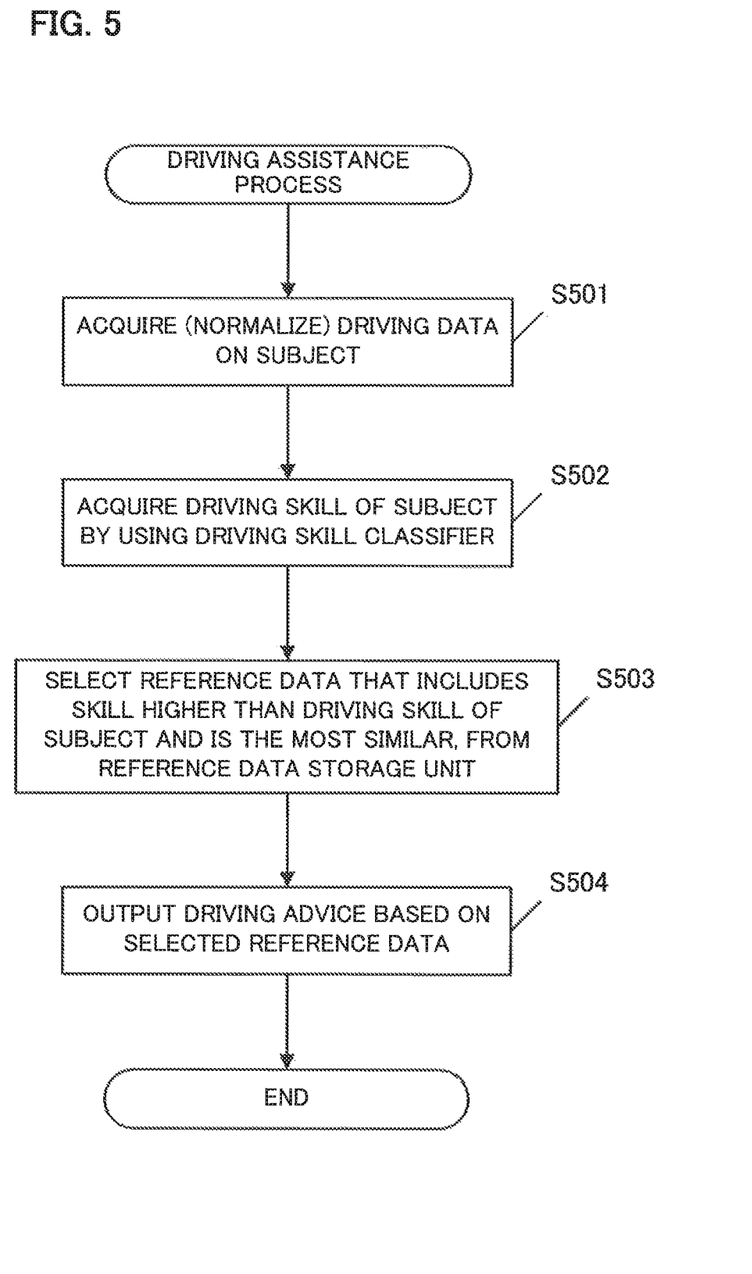
FIG. 5 is a flowchart showing an overall flow of a driving assistance process according to this embodiment.

A specific operational example of the driving assistance device according to this embodiment will be now described with reference to the figures. FIG. 5 is a flowchart showing an overall flow of a driving assistance process. Herein, the learning process (FIG. 3) of the driving skill classifier 5 is already completed.

The driving assistance device 1 acquires data obtained when the vehicle is actually driven, from the vehicle sensors 2 by the driving data acquisition unit 4 (S501). At this time, the driving data is converted (normalized) into data at regular intervals with respect to a position. Then, the driving data is input to the driving skill classifier 5, and a driving skill of this driving is acquired (S502).

Figure 6:
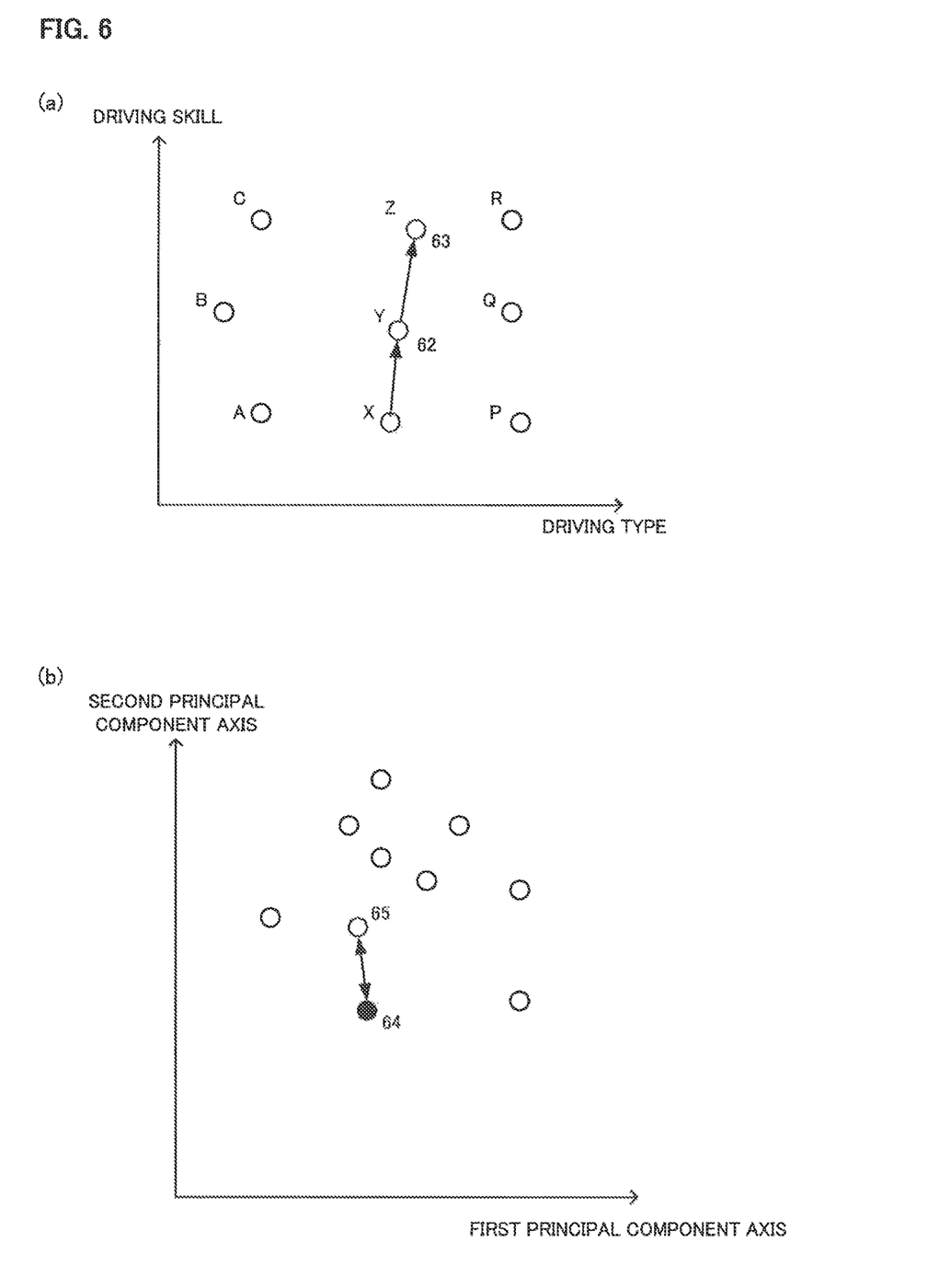
FIG. 6 each are a diagram for illustrating the selection of driving data that is the base of driving advice.

The driving assistance device 1 selects, from the reference data storage unit 6, driving data that includes a driving skill higher than the driving skill of a subject, and has a driving type which is the most similar to the driving type of the subject (S503). FIG. 6A is a diagram for conceptually illustrating this process. In FIG. 6A, analysis results of driving data on nine drivers are plotted, the abscissa represents a driving type, and the ordinate represents a driving skill. The higher the drivers are plotted along the former, the higher their driving skills are, while the shorter a horizontal distance between the driving data on drivers is along the latter, the more similar the driving types of the drivers are. In FIG. 6A, the driving data on nine drivers are plotted. Drivers whose driving skills are higher than X are six drivers B, C, Y, Z, Q and R. From among these, Y whose driving type is the most similar to X is selected as reference data. Additionally, in a case where Y is a subject, from among three of C, Z and R whose driving skills are higher than that of Y, Z whose driving type is the most similar to Y is selected as reference data.

FIG. 6B is a conceptual diagram for illustrating a determination process of a driving type by principal component analysis. FIG. 6B is a scatter diagram of data obtained by integrating driving data into two variables (a first principal component and a second principal component). A similarity is defined by using suitable distance measure (Euclidean distance, weighted Euclidean distance, Mahalanobis distance or the like) on this data space. In FIG. 6B, a black circle 64 represents the driving data on a subject to be assisted. Additionally, it is assumed that driving data that includes a driving skill higher than the driving skill of the black circle 64 is plotted in FIG. 6B. Driving data that is the most similar to the driving data on the subject is driving data 65, and therefore this data is selected as data for determining advice.

The driving assistance device 1 detects a difference between the driving data on the subject and the selected data, by using the difference detection unit 8. For example, difference in speed (brake amount) before a curve is seen, and as a result, variation in handle steering angles, or difference of cross-directional jerks appears.

Figure 7:
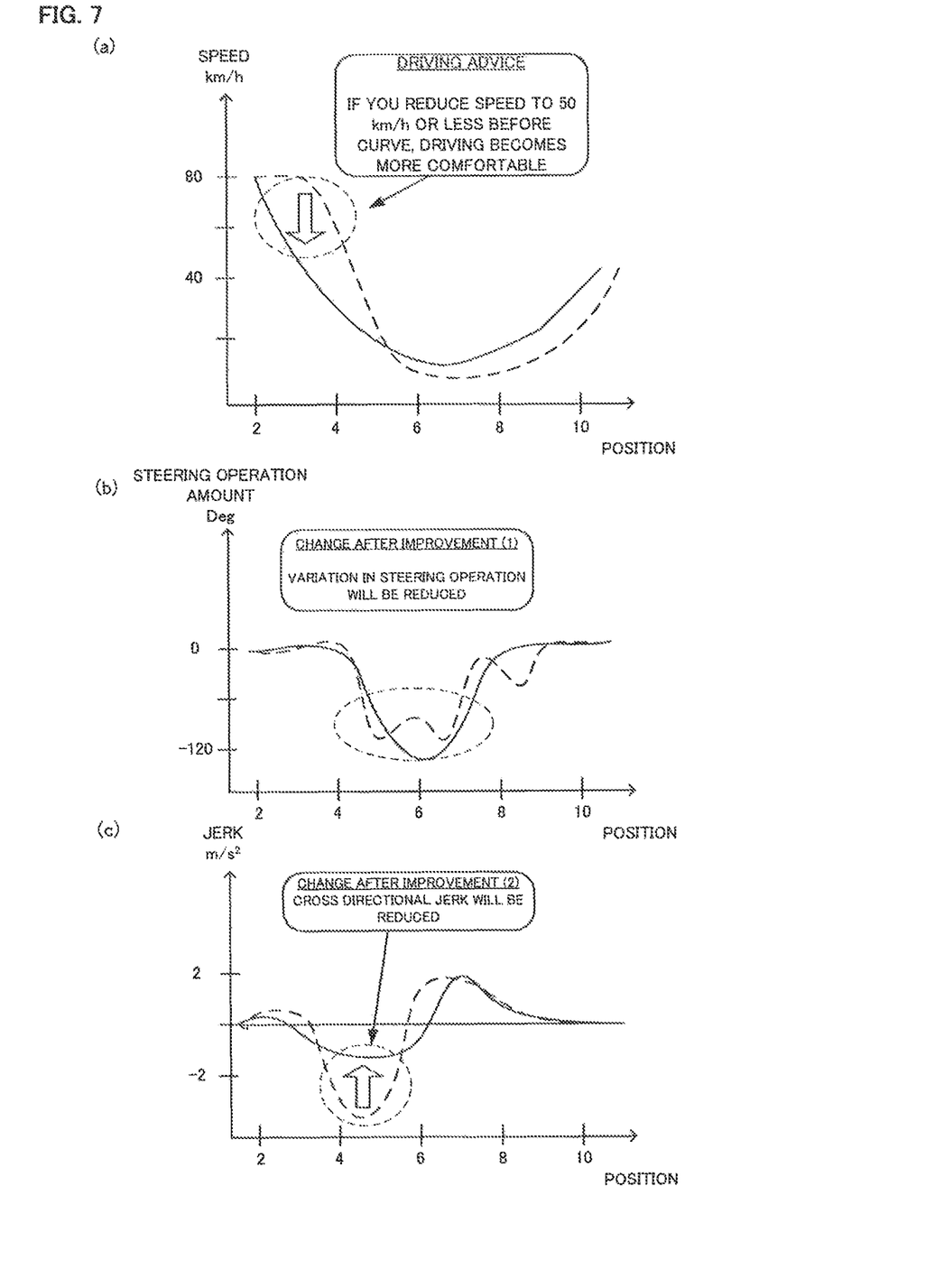
FIG. 7 each are a diagram showing an example of presented driving advice.

The driving assistance unit 9 prepares driving advice as shown in FIG. 7 on the basis of such a difference detection result. In the driving advice, the speed before the curve that is an operation amount that causes the difference is advised as a point to be corrected, among the differences detected by the difference detection unit 8 (FIG. 7A). Specifically, advice mentioning that the speed should be decelerated to 50 km an hour or less before the curve in a case of the curve of this traveling course is presented. Furthermore, the difference that become a result among the differences detected by the difference detection unit 8 is presented as a result obtained by performing such correction. Herein, reduced variation in steering handle operation (FIG. 7B) on the curve, and reduced cross-directional jerk (FIG. 7C) are presented as effects by the improvement.

(Act/Effect of the Embodiment)

In this embodiment, the driving skill of a subject to be advised is determined, and driving advice is given based on driving data that includes a driving skill higher than the driving skill of the subject, and has the most similar driving type as a reference. Therefore, it is possible to avoid advice based on the driving data on a driver whose driving type is greatly different from the driving type of the subject. Since driving of a driver of different driving type not very reliable in the improvement of driving, driving data that is made a reference of driving advice is selected from among driving data on drivers whose driving types are similar, thereby enabling suitable driving advice. Additionally, it is expected that in a case where there is a big difference in driving skill, it is determined that driving types are also greatly different. Therefore, according to this embodiment, it is possible to present advice based on the driving data on a driver who drives better than a subject and has a skill that is not extremely different from that of the subject.

(Others)

Although the driving assistance device is mounted on the vehicle in the aforementioned description, it is not necessary that the driving assistance device is mounted on the vehicle. That is, as long as the driving assistance device receives driving data regarding driving by a subject to be advised as input, the driving assistance device may be configured as a device provided separately from the vehicle. At this time, the transfer of data may be wired or wireless communication, or may be performed via a storage medium.

It is not necessary that the driving data is always data that is obtained when the vehicle is actually driven. That is, the driving data may be data that is obtained when driving operation is performed by using vehicle driving simulator.

Although the sensor data is converted into data for each constant distance to be used in the aforementioned description, this is not always essential. For example, sensor data temporally sampled at regular intervals may be used. However, it is expected that the data for each constant distance is more preferable for determination of a driving skill or a driving type.

REFERENCE SIGNS LIST

1 DRIVING ASSISTANCE DEVICE
2 VEHICLE SENSOR
3 MAP DATA STORAGE UNIT
4 DRIVING DATA ACQUISITION UNIT
4a TRAVELING PATH ACQUISITION UNIT
4b NORMALIZATION UNIT
5 DRIVING SKILL CLASSIFIER
6 REFERENCE DATA STORAGE UNIT
7 SIMILARITY DATA ACQUISITION UNIT
8 DIFFERENCE DETECTION UNIT
9 DRIVING ASSISTANCE UNIT
10 OUTPUT DEVICE

The invention claimed is:

1. A driving assistance device comprising:
a driving data storage configured to store, for a plurality of drivers, corresponding reference driving data entries in association with a driving skill for a respective driver of the plurality of the drivers;
a memory storing instructions; and
a processor that, when executing the instructions performs a method, the method comprising:
receiving input of driving data from a plurality of vehicle sensors;
determining a driving skill associated with the input driving data;
calculating a similarity between the input driving data and each of the corresponding reference driving data entries stored in the driving data storage;
selecting, after determining the driving skill, one of the corresponding reference driving data entries stored in the driving data storage that:
is associated with a higher driving skill than the determined driving skill of the input driving data, and
has a similarity with the input driving data that exceeds a threshold;
detecting a difference in driving operation between the input driving data and the selected reference driving data entry, wherein detecting comprises:
identifying an approaching curve in a path of a vehicle,
determining a maximum speed for the approaching curve, and
determining, based on data from the plurality of vehicle sensors, that a current speed of the vehicle exceeds the maximum speed for the approaching curve; and
issuing a notice of the detected difference as driving advice, wherein issuing the notice comprises:
providing, through an output device, a graphical user interface containing instructions for an operator of the vehicle including:
an instruction to decelerate the vehicle to below the maximum speed for the approaching curve, and
a graphical representation of at least one benefit to following the instruction.

2. The driving assistance device according to claim 1, wherein the similarity between the selected driving data entry and the input driving data is higher than a similarity between another reference driving data entry of the corresponding reference driving data entries and the input driving data; and
the instruction to decelerate the vehicle to below the maximum speed for the approaching curve is provided by the graphical user interface in realtime.

3. The driving assistance device according to claim 1, wherein receiving the input driving data comprises periodically acquiring sensor data from the plurality of vehicle sensors, and converting the sensor data into data corresponding to positions at even intervals in order to obtain the input driving data; and
wherein the graphical representation of at least one benefit to following the instruction includes:
a plot of projected kinematic data of the vehicle based on the data from the plurality of vehicle sensors, and
a plot of projected kinematic data based on the instruction to decelerate the vehicle.

4. A driving assistance method performed by a driving assistance device that includes a driving data storage for storing, for a plurality of drivers, corresponding reference driving data entries in association with a driving skill for a respective driver of the plurality of the drivers; and a driving skill classifier for determining a driving skill associated with input driving data, the driving assistance method comprising:
receiving the input of driving data from a plurality of vehicle sensors;
determining a driving skill of the input driving data by the driving skill classifier;
calculating a similarity between the input driving data and each of the corresponding reference driving data entries stored in the driving data storage;
selecting one of the corresponding reference driving data entries stored in the driving data storage that:
is associated with a higher driving skill than the determined driving skill of the input driving data, and
has a similarity with the input driving data that exceeds a threshold;
detecting a difference in driving operation between the input driving data and the selected reference driving data entry, wherein detecting comprises:
identifying an approaching curve in a path of a vehicle,
determining a maximum speed for the approaching curve, and
determining, based on data from the plurality of vehicle sensors, that a current speed of the vehicle exceeds the maximum speed for the approaching curve; and
issuing a notice of the detected difference as driving advice, wherein issuing the notice comprises:
providing, through an output device, a graphical user interface containing instructions for an operator of the vehicle including:
an instruction to decelerate the vehicle to below the maximum speed for the approaching curve, and
a graphical representation of at least one benefit to following the instruction.

5. The driving assistance method according to claim 4, wherein
the similarity selected driving data entry and the input driving data is higher than a similarity between another reference driving data entry of the corresponding reference driving data entries and the input driving data; and the instruction to decelerate the vehicle to below the maximum speed for the approaching curve is provided by the graphical user interface in realtime.

6. The driving assistance method according to claim 4, further comprising
periodically acquiring sensor data from the plurality of vehicle sensors, and
converting the sensor data into data corresponding to positions at even intervals in order to obtain the input driving data;
wherein the graphical representation of at least one benefit to following the instruction includes:
a plot of projected kinematic data of the vehicle based on the data from the plurality of vehicle sensors, and
a plot of projected kinematic data based on the instruction to decelerate the vehicle.

7. A driving assistance device comprising:
driving data storage means for storing, for a plurality of drivers, corresponding reference driving data entries in association with a driving skill for a respective driver of the plurality of the drivers; and
driving data acquisition means for receiving input of driving data from a plurality of vehicle sensors;
driving skill classification means for determining a driving skill associated with the input driving data;
similarity calculation means for calculating a similarity between the input driving data and each of the corresponding reference driving data entries stored in the driving data storage means;
selection means for selecting one of the corresponding reference driving data entries stored in the driving data storage means that:
is associated with a higher driving skill than the determined driving skill of the input driving data, and
has a similarity with the input driving data that exceeds a threshold;
difference detection means for detecting a difference in driving operation between the input driving data and the selected reference driving data entry, wherein detecting comprises:
identifying an approaching curve in a path of a vehicle,
determining a maximum speed for the approaching curve, and
determining, based on data from the plurality of vehicle sensors, that a current speed of the vehicle exceeds the maximum speed for the approaching curve; and
driving assistance means for issuing a notice of the detected difference as driving advice, wherein issuing the notice comprises:
providing, through an output device, a graphical user interface containing instructions for an operator of the vehicle including:
an instruction to decelerate the vehicle to below the maximum speed for the approaching curve, and
a graphical representation of at least one benefit to following the instruction.

8. The driving assistance device according to claim 7, wherein the similarity between the selected driving data entry and the input driving data is higher than a similarity between another reference driving data entry of the corresponding reference driving data entries and the input driving data; and
the instruction to decelerate the vehicle to below the maximum speed for the approaching curve is provided by the graphical user interface in realtime.

9. The driving assistance device according to claim 7, wherein the driving data acquisition means periodically acquires sensor data from the plurality of vehicle sensors, and converts the sensor data into data corresponding to positions at even intervals in order to obtain the input driving data; and
wherein the graphical representation of at least one benefit to following the instruction includes:
a plot of projected kinematic data of the vehicle based on the data from the plurality of vehicle sensors, and
a plot of projected kinematic data based on the instruction to decelerate the vehicle.

10. The driving assistance device according to claim 1, wherein
calculating comprises:
plotting the input driving data and the reference driving data entries with a plot including an abscissa representing driving type and an ordinate representing driving skill; and
calculating a distance measurement between the input driving data and the reference driving data entries; and
wherein selecting comprises:
identifying one of the reference driving data entries having a driving skill that is greater than the determined driving skill associated with the input driving data and has a distance measurement that is less than a predetermined distance.

11. The driving assistance method according to claim 4, wherein
calculating comprises:
plotting the input driving data and the reference driving data entries with a plot including an abscissa representing driving type and an ordinate representing driving skill; and
calculating a distance measurement between the input driving data and the reference driving data entries; and
wherein selecting comprises:
identifying one of the reference driving data entries having a driving skill that is greater than the determined driving skill associated with the input driving data and has a distance measurement that is less than a predetermined distance.

12. The driving assistance device according to claim 7, wherein
calculating comprises:
plotting the input driving data and the reference driving data entries with a plot including an abscissa representing driving type and an ordinate representing driving skill; and
calculating a distance measurement between the input driving data and the reference driving data entries; and
wherein selecting comprises:
identifying one of the reference driving data entries having a driving skill that is greater than the determined driving skill associated with the input driving data and has a distance measurement that is less than a predetermined distance.

* * * * *